US008811624B2

(12) United States Patent
Zhan (10) Patent No.: US 8,811,624 B2
(45) Date of Patent: Aug. 19, 2014

(54) ECHO CANCELLATION METHOD AND DEVICE (71) Applicant: Huawei Technologies Co., Ltd., Guangdong (CN)

(72) Inventor: Wuzhou Zhan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/015,319

(22) Filed: Aug. 30, 2013

(65) Prior Publication Data
US 2014/0105410 A1  Apr. 17, 2014

(30) Foreign Application Priority Data

Oct. 12, 2012  (CN) .......................... 2012 1 0387313

(51) Int. Cl.
H04B 3/20  (2006.01)
G10K 11/175  (2006.01)
H04M 9/08  (2006.01)

(52) U.S. Cl.
CPC ............. *G10K 11/175* (2013.01); *H04M 9/082* (2013.01); *G10K 2210/505* (2013.01)
USPC ...... 381/66; 381/71.1; 381/71.11; 381/71.12; 381/94.1

(58) Field of Classification Search
USPC .......... 381/66, 71.1, 71.11, 71.12, 94.1–94.9; 379/406.01, 406.05, 406.06, 406.07, 379/406.08
See application file for complete search history.

(56) References Cited

U.S. PATENT DOCUMENTS

| 7,783,478 B2 | 8/2010 | Goldin | |
| 2011/0044461 A1* | 2/2011 | Kuech et al. | 381/66 |
| 2012/0010879 A1 | 1/2012 | Tsujino et al. | |

FOREIGN PATENT DOCUMENTS

| CN | 1805011 A | 7/2006 |
| CN | 101778183 A | 7/2010 |
| CN | 102379004 A | 3/2012 |
| JP | 2003284184 A | 10/2003 |
| WO | WO 2009151062 A1 | 12/2009 |

* cited by examiner

Primary Examiner — Vivian Chin
Assistant Examiner — Paul Kim
(74) Attorney, Agent, or Firm — Leydig, Voit & Mayer, Ltd.

(57) ABSTRACT

The present invention discloses an echo cancellation method. The method includes: dividing an audio signal into a high-band audio signal and a low-band audio signal; performing adaptive filtering on the low-band audio signal, and performing synthesis filtering on a signal obtained after the low-band audio signal undergoes the adaptive filtering and on the high-band audio signal to generate a preliminary echo cancellation signal; performing envelope predication echo suppression on a high-band signal in the preliminary echo cancellation signal, and calculating and outputting a residual echo suppression coefficient; performing echo suppression on a low-band signal in the preliminary echo cancellation signal, and outputting a processing result; and multiplying the output result by the residual echo suppression coefficient, and outputting a signal of which echoes are canceled.

13 Claims, 6 Drawing Sheets

ECHO CANCELLATION METHOD AND DEVICE

CROSS-REFERENCE TO RELATED APPLICATION

This application claims priority to Chinese Patent Application No. 201210387313.8, filed on Oct. 12, 2012, which is hereby incorporated by reference in its entirety.

TECHNICAL FIELD

The present invention relates to the audio signal processing field, and in particular, to an echo cancellation method and device.

BACKGROUND

Figure 1:
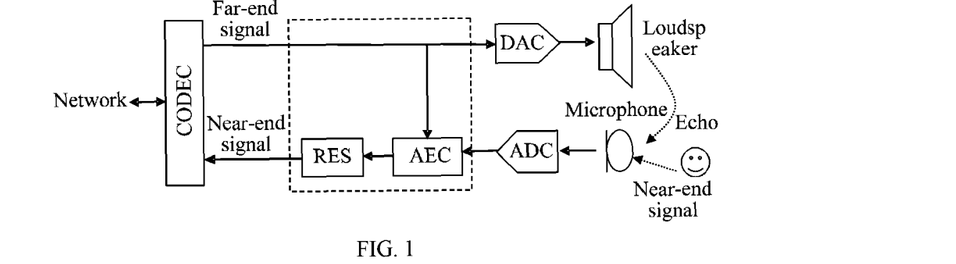
FIG. 1 is a flow chart of a method in the background of the present invention.

FIG. 1 is a schematic view showing an application scenario of an echo cancellation technology. A far-end signal transmitted from a network passes through a CODEC module, that is, the far-end signal is decoded by the CODEC module, and then is delivered to a DAC (Digital to Analog Converter) for digital/analog conversion, and finally is sent to a loudspeaker for playing. A microphone located in the same place collects a near-end signal, and meanwhile collects the far-end signal (that is, an echo) played by the loudspeaker. After an echo cancellation is performed on the signals collected by the microphone, the echoes in the signals collected by the microphone are canceled, and only the near-end signal is left. The near-end signal is coded by the CODEC module and then is sent to a far end via the network. If the echoes in the signals collected by the microphone are not canceled, after the signals are sent to the far end, the far end hears the sound of its own. Therefore, the objective of the echo cancellation technology is to cancel the echoes as much as possible, and reserve the near-end signal.

An echo cancellation device generally includes two parts: an AEC (Adaptive Echo Canceller), and an RES (Residual Echo Suppressor). In the adaptive echo cancellation, an adaptive filter is used to simulate a spatial echo path, and cancel the echoes in the signals collected by the microphone. Generally, due to the effect of factors such as the noise, the AEC module cannot completely cancel the echoes, so the RES module is required to perform further echo suppression processing on the residual echoes.

The adaptive filtering has such algorithms as: an NLMS (Normalized Least Mean Square) algorithm, an RLS (Recursive Least Square) algorithm, and an MDF (Multi-delay block frequency domain adaptive filter) algorithm (where, the MDF algorithm is an implementation form of the NLMS algorithm in a frequency domain). When the reverberation time is long and a sampling rate is high, the adaptive filter needs a long order. For example, when the reverberation time is 300 ms and the sampling rate is 48 khz, the needed order is 48000×0.3=14400; as a result, the calculation amount of the adaptive filter is very high, thereby increasing the cost of the device.

Figure 2:
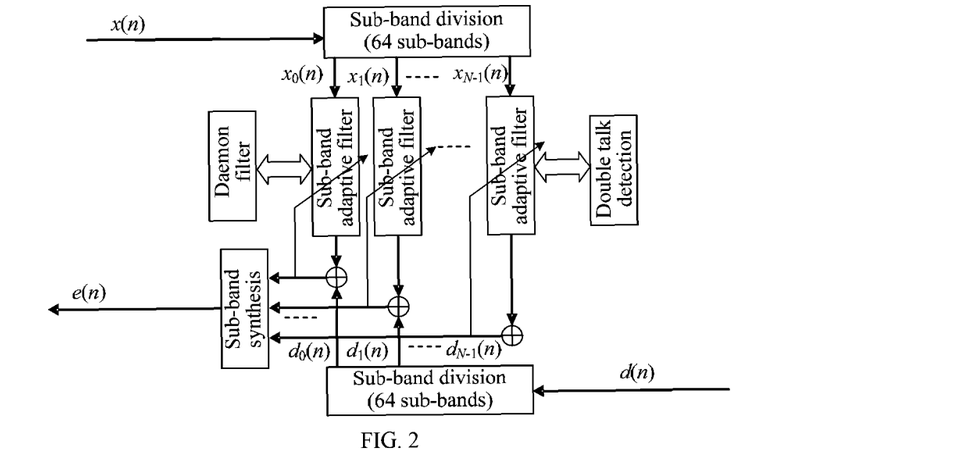
FIG. 2 is a flow chart of a method in the prior art in the background of the present invention.

In the conventional art, to reduce the complexity, the process of sub-band adaptive filtering is adopted to solve this problem. As shown in FIG. 2, the sub-band division is performed on the near-end signal d(n) and the far-end signal x(n) respectively, and a bandwidth of each sub-band is 250 Hz; therefore, when the sampling rate is 8 KHz, 16 sub-bands may be divided in total; when the sampling rate is 16 KHz, 32 sub-bands may be divided in total; when the sampling rate is 32 KHz, 64 sub-bands may be divided in total. Each sub-band uses the NLMS algorithm to perform the echo cancellation, and afterwards, the sub-bands are summarized to obtain a residual echo signal.

In research of the conventional art, the following problems at least exist:

(1) Echo leakage may occur at a sub-band boundary. It is found through debugging that, the echo attenuation of the sub-band adaptive filter is obviously insufficient at the sub-band boundary, and a strong single-frequency signal (which sounds like a bang, affecting the subjective feeling) is usually left.

(2) A convergence effect of the high sub-band adaptive filter is poor.

SUMMARY

In view of this, it is necessary to provide an echo cancellation method and device, so as to solve the foregoing problems.

An embodiment of the present invention provides an echo cancellation method, including:

dividing, by performing Quadrature Mirror Filter (QMF) analysis filtering, an audio signal to be processed into a high-band audio signal and a low-band audio signal;

performing adaptive filtering on the low-band audio signal, and performing synthesis filtering on a signal obtained after the low-band audio signal undergoes the adaptive filtering and on the high-band audio signal to generate a preliminary echo cancellation signal;

performing envelope predication echo suppression on a high-band signal in the preliminary echo cancellation signal, and calculating and outputting a residual echo suppression coefficient;

performing echo suppression on a low-band signal in the preliminary echo cancellation signal, and outputting a processing result; and multiplying the output result by the residual echo suppression coefficient, and outputting a signal of which echoes are canceled.

This method not only effectively reduces the calculation amount in the echo cancellation, but also solves an echo leakage problem existing at a sub-band boundary.

Meanwhile, an embodiment of the present invention provides an AEC module for echo cancellation, including:

a reference signal analysis filter, configured to divide a reference signal into a high-band reference signal and a low-band reference signal, output the high-band reference signal to an artificial echo synthesis filter, and output the low-band reference signal to an adaptive filter;

a to-be-processed audio signal analysis filter, configured to divide an audio signal to be processed into a high-band audio signal to be processed and a low-band audio signal to be processed, output the high-band audio signal to be processed to a preliminary echo cancellation signal synthesis filter, and output the low-band audio signal to be processed to the adaptive filter;

the adaptive filter, connected to the reference signal analysis filter and the to-be-processed audio signal analysis filter; configured to perform adaptive filtering on the low-band reference signal to generate a low-band artificial echo signal, output the low-band artificial echo signal to the artificial echo synthesis filter, perform adaptive filtering on the low-band audio signal to be processed to generate a low-band preliminary echo cancellation signal, and output the low-band preliminary echo cancellation signal to the preliminary echo cancellation signal synthesis filter;

the artificial echo synthesis filter, connected to the adaptive filter; configured to synthesize the high-band reference signal and the low-band artificial echo signal into an artificial echo signal; and the preliminary echo cancellation signal synthesis filter, connected to the adaptive filter; configured to synthesize the high-band audio signal to be processed and the low-band preliminary echo cancellation signal into a preliminary echo cancellation signal.

An embodiment of the present invention further provides an RES module for echo cancellation, including:

an FFT conversion module, configured to perform FFT conversion on a reference signal, an audio signal to be processed, an artificial echo signal, and a preliminary echo cancellation signal, generate a reference frequency domain signal, a to-be-processed frequency domain audio signal, an artificial echo frequency domain signal, and a preliminary echo cancellation frequency domain signal, respectively; input the to-be-processed frequency domain audio signal, the artificial echo frequency domain signal, and the preliminary echo cancellation frequency domain signal to an RES low-band module, and input the reference frequency domain signal and the preliminary echo cancellation frequency domain signal to an RES high-band module;

the RES high-band module, configured to perform envelope predication echo suppression on a high-band signal in the preliminary echo cancellation frequency domain signal, and calculate and output a residual echo suppression coefficient; and the RES low-band module, configured to perform echo suppression on a low-band signal in the preliminary echo cancellation frequency domain signal, and output a processing result.

This device not only effectively reduces the calculation amount in the echo cancellation, but also solves an echo leakage problem existing at a sub-band boundary.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An embodiment of the present invention provides an echo cancellation method, so as to cancel an echo in an audio signal to be processed and then output a signal of which echoes are canceled.

Figure 3:
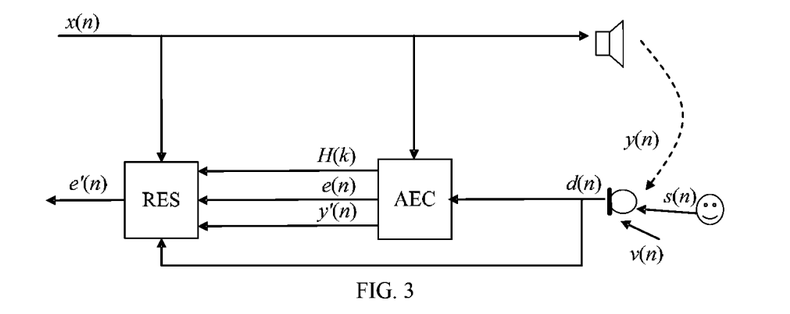
FIG. 3 is a structural diagram of a device in a first embodiment of the present invention.
Figure 4:
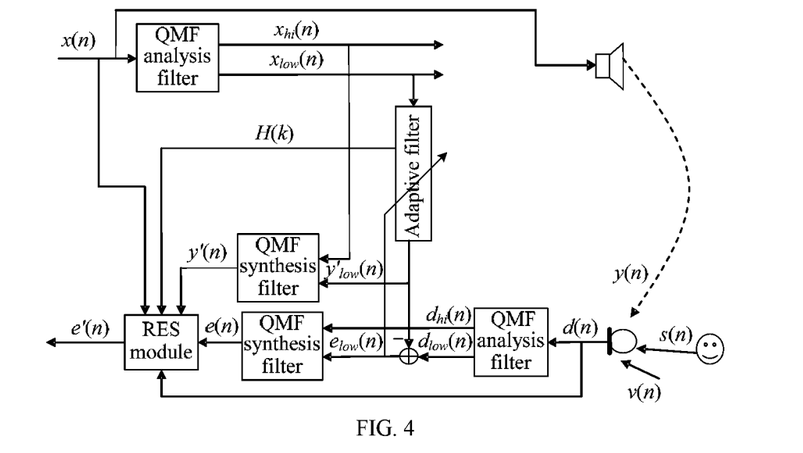
FIG. 4 is a flow chart of a method in a first embodiment of the present invention.

Referring to FIG. 3, a reference signal x(n) (that is, a far-end signal, in this disclosure, the reference signal and the far-end signal have the same meaning) is output to a loudspeaker for playing; a microphone collects an audio signal d(n) to be processed, where the audio signal includes an echo signal y(n), a local-end signal s(n) and a noise v(n); the audio signal to be processed is processed by an AEC module and an RES module, the echo signal y(n) and the noise v(n) are canceled, and the local-end signal is reserved. Specifically, the method includes the following steps, as shown in FIG. 4.

S1: An AEC module performs preliminary echo cancellation on an audio signal to be processed, and generates a preliminary echo cancellation signal e(n).

The AEC module processes a reference signal x(n) and an audio signal d(n) to be processed, outputs a preliminary echo cancellation signal e(n), an artificial echo signal y'(n), and a low-band echo filtering coefficient H(k) of a frequency domain; and outputs the reference signal x(n) and the audio signal d(n) to be processed to an RES module. Specifically, the step includes:

(1) generating the artificial echo signal y'(n) according to the reference signal x(n), where after the reference signal x(n) is processed by a QMF analysis filter, a high-band reference signal $x_{hi}(n)$ and a low-band reference signal $x_{low}(n)$ are generated; the high-band reference signal $x_{hi}(n)$ is output to the QMF synthesis filter and the low-band reference signal $x_{low}(n)$ is output to an adaptive filter;

after the low-band reference signal $x_{low}(n)$ is processed by the adaptive filter, a low-band artificial echo signal $y'_{low}(n)$ is generated, and is output to the QMF synthesis filter; and the high-band reference signal $x_{hi}(n)$ and the low-band artificial echo signal $y'_{low}(n)$ are input to the QMF synthesis filter and are processed to generate an artificial echo signal y'(n); and the artificial echo signal y'(n) is output to the RES module;

(2) generating a preliminary echo cancellation signal e(n) according to the audio signal d(n) to be processed, where after the audio signal d(n) to be processed is processed by the QMF synthesis filter, a high-band audio signal to be processed $d_{hi}(n)$ and a low-band audio signal to be processed $d_{low}(n)$ are generated; the high-band audio signal to be processed $d_{hi}(n)$ is output to the QMF synthesis filter;

the low-band artificial echo signal $y'_{low}(n)$ is subtracted from the low-band audio signal to be processed $d_{low}(n)$, to obtain a low-band preliminary echo cancellation signal $e_{low}(n)$, which is then output to the QMF synthesis filter module; and after the high-band audio signal to be processed $d_{hi}(n)$ and the low-band preliminary echo cancellation signal $e_{low}(n)$ are processed by the QMF synthesis filter, a preliminary echo cancellation signal $e(n)$ is generated, and then is output to the RES module.

The low-band echo filtering coefficient $H(k)$ of the frequency domain is obtained through calculation in a process of the adaptive filter processing the low-band reference signal.

In addition, the AEC module further outputs the reference signal $x(n)$ and the audio signal $d(n)$ to be processed to the RES module.

Figure 5:
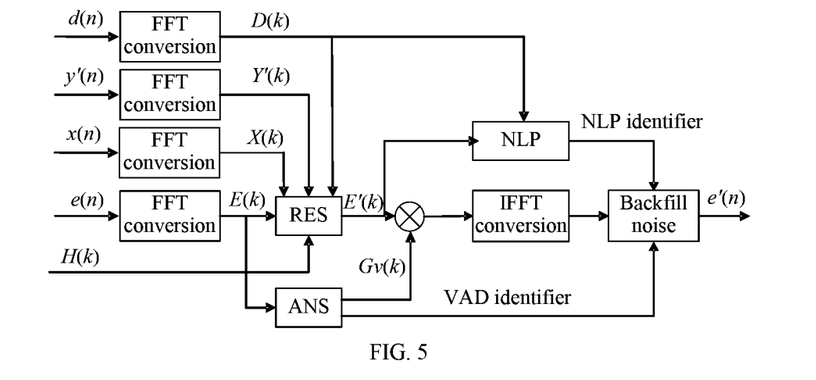
FIG. 5 is a flow chart of a method in a first embodiment of the present invention.

S2: The RES module performs further echo cancellation on the preliminary echo cancellation signal $e(n)$, and generates a signal of which echoes are canceled, as shown in FIG. 5.

Figure 6:
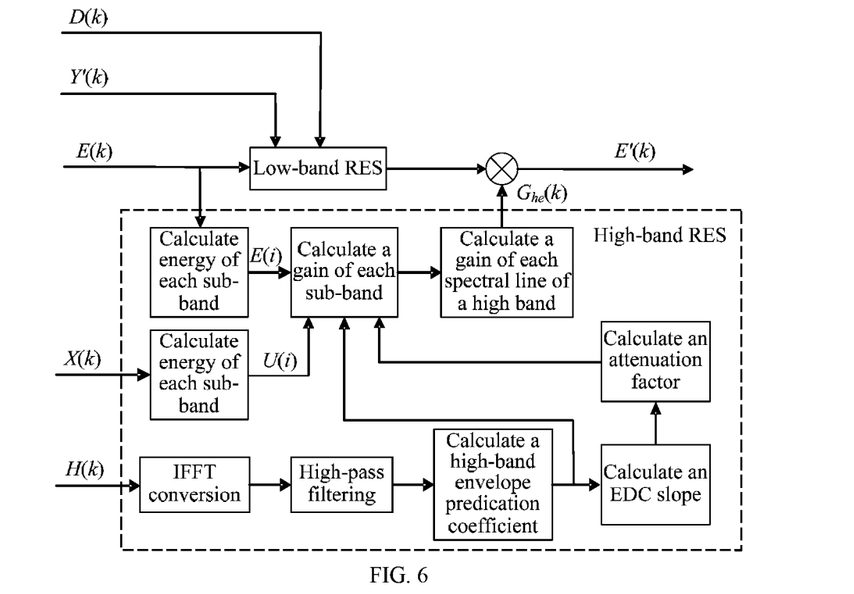
FIG. 6 is a flow chart of a method in a first embodiment of the present invention.

S201: The RES module performs fast Fourier transformation (FFT, Fast Fourier Transformation) on the reference signal $x(n)$, the audio signal $d(n)$ to be processed, the artificial echo signal $y'(n)$, and the preliminary echo cancellation signal $e(n)$, and generates a reference frequency domain signal $X(k)$, a to-be-processed frequency domain audio signal $D(k)$, an artificial echo frequency domain signal $Y'(k)$, and a preliminary echo cancellation frequency domain signal $E(k)$, respectively; inputs the to-be-processed frequency domain audio signal $D(k)$, the artificial echo frequency domain signal $Y'(k)$, and a residual frequency domain echo signal $E(k)$ to an RES low-band module, and inputs the reference frequency domain signal $X(k)$, the low-band echo filtering coefficient $H(k)$, and the preliminary echo cancellation frequency domain signal $E(k)$ to an RES high-band module, as shown in FIG. 6.

S203: The RES high-band module performs envelope predication echo suppression on a high-band signal (in the following, referred to as a "high-band signal") in the preliminary echo cancellation frequency domain signal $E(k)$, and calculates and outputs a residual echo suppression coefficient $G_{he}(k)$; the RES low-band module performs echo suppression on a low-band signal (in the following, referred to as a "low-band signal") in the preliminary echo cancellation frequency domain signal $E(k)$ by using the existing echo suppression technology, and outputs a processing result, as shown in FIG. 6.

It should be noted that, to eliminate an aliasing effect, the high-band signal overlaps the low-band signal; if 512 spectral lines exist, the RES low-band module performs residual echo suppression on the top 263 spectral lines, and the RES high-band module performs suppression on the final 231 spectral lines; therefore, 32 spectral lines overlap in total.

The process of the RES high-band module calculating the residual echo suppression coefficient is as follows: according to energy $E(i)$ of each sub-band of the preliminary echo cancellation frequency domain signal $E(k)$, energy $U(i)$ of each sub-band of the reference frequency domain signal $X(k)$, energy $E(i)$ of each sub-band of the residual echo frequency domain signal, a high-band envelope predication coefficient $g_l(i)$, and an attenuation factor of the high-band envelope predication coefficient, calculating a gain of each sub-band; and according to the gain of each sub-band, calculating a gain $G_{he}(k)$ of each spectral line of the high band, that is, a residual echo coefficient. Specifically, the process includes the following steps:

(1) Calculate energy $E(i)$ of each sub-band of the preliminary echo cancellation frequency domain signal $E(k)$, energy $U(i)$ of each sub-band of the reference frequency domain signal $X(k)$, energy $E(i)$ of each sub-band of the residual echo frequency domain signal, a high-band envelope predication coefficient $g_l(i)$, and an attenuation factor of the high-band envelope predication coefficient.

A. The RES high-band module estimates an echo of the high band by using an envelope predication method, and then performs suppression, where the envelope predication is a manner of estimating energy of an echo of a current frame by using energy of a reference signal of previous several frames on the basis of the frequency domain without considering the effect of the phase, which is shown in the following formula:

$$\tilde{E}(i) = \sum_{l=0}^{L-1} g_l(i) U_{-l}(i). \tag{1}$$

Figure 7:
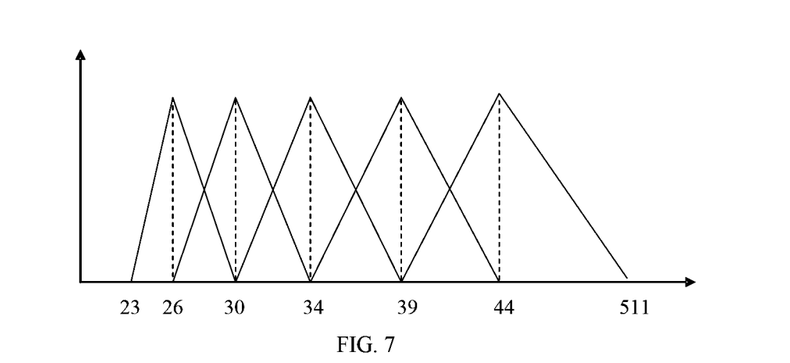
FIG. 7 is a reference view showing a sub-band division manner in a first embodiment of the present invention.

In the formula, i represents a serial number of the sub-band divided on the basis of the frequency domain, and L is the frame number for the envelope predication, $g_l(i)$ represents a first coefficient of the ith sub-band, $U_{-l}(i)$ represents energy of the ith sub-band of the first frame in the reference frequency domain signal $X(k)$. When the number of the spectral lines is 512, a sub-band division manner of the high-band RES is shown in FIG. 7, where 5 sub-bands are obtained in total, and the sub-bands overlap in a quarter window manner.

It should be noted that, in this embodiment, the sub-bands overlap in the quarter window manner, but the manner is not limited thereto, and the sub-bands may also overlap in a sine window or a rectangle window manner.

$\tilde{E}(i)$ represents energy, of the residual echo frequency domain signal, estimated by the ith sub-band. As described in the above, the audio signal $d(n)$ to be processed includes three parts, namely, an echo signal $y(n)$, a local-end signal $s(n)$, and a noise $v(n)$. After the AEC module performs the preliminary echo cancellation on the audio signal $d(n)$ to be processed, a preliminary echo cancellation signal $e(n)$ is generated. After FFT conversion is performed on the preliminary echo cancellation signal, a preliminary echo cancellation frequency domain signal $E(k)$ is generated. Therefore, the preliminary echo cancellation frequency domain signal $E(k)$ also includes three parts: a residual echo frequency domain signal, a local-end frequency domain signal, and a noise frequency domain signal.

B. A formula for calculating $U(i)$ is as follows:

$$U(i) = \sum_{k=kl(i)}^{kh(i)} w_k(i) |X(k)|^2. \tag{2}$$

In the formula, $kl(i)$ represents an initiation frequency of the ith sub-band, $kh(i)$ represents an ending frequency of the ith sub-band, and $w_k(i)$ represents a weighting coefficient of each frequency. If $kc(i)$ is enabled to represent a center frequency of the ith sub-band, a value of $w_k(i)$ is calculated by using the following formula:

$$\begin{cases} w_k(i) = \dfrac{(k - kl(i))}{(kc(i) - kl(i))} & k >= kl(i) \,\&\&\, k <= kc(i) \\ w_k(i) = 1 - \dfrac{(k - kc(i))}{(kh(i) - kc(i))} & k > kc(i) \,\&\&\, k <= kh(i) \end{cases} \tag{3}$$

where, the value of kl(i) is kc(i−1), and the value of kh(i) is kc(i+1); in this way, the value may enhance the smooth effect of the sound.

Through the foregoing manner of calculating U(i), energy of each sub-band of the preliminary echo cancellation frequency domain signal E(k) may be calculated:

$$E(i) = \sum_{k=kl(i)}^{kh(i)} w_k(i)|E(k)|^2. \qquad (4)$$

C. If an echo impulse response $h_n(i)$ of each sub-band is learned, the envelope predication coefficient $g_l(i)$ may be calculated as follows:

$$g_l(i) = \sum_{n=l*N}^{l*N+N-1} h_n(i)*h_n(i). \qquad (5)$$

In the formula, N represents the frame length. Because the low-band echo filtering coefficient H(k) can only be obtained, a high-band filtering coefficient can only be approximated by using the low-band echo filtering coefficient. The specific implementation method is as follows: performing IFFT conversion on H(k) to obtain a low-band impulse response of a time domain, and then performing high-pass filtering to obtain a high sub-band impulse response $h0_n$; finally, calculating the envelope prediction coefficient by using the foregoing formula as follows:

$$g_l(i) = \sum_{n=l*N}^{l*N+N-1} h0_n * h0_n. \qquad (6)$$

It can be learned from the foregoing formula that, each sub-band of the high band uses the same envelope predication coefficient.

D. Calculate an attenuation factor of the envelope predication coefficient.

Figure 8:
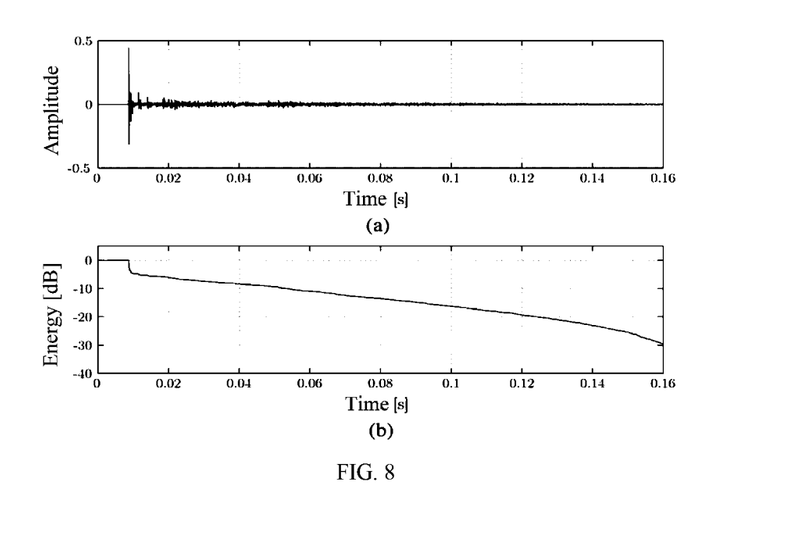
FIG. 8 is an example view showing an echo impulse response and an energy decay curve in a first embodiment of the present invention.

FIG. 8 is an example showing an echo impulse response and an energy decay curve (EDC).

It can be seen that, the EDC is basically linear at the middle part. The EDC is defined as:

$$EDC(i) = 10*\log 10\left(\sum_{n=i}^{L*N} h_n*h_n\right) \qquad (7)$$

where i represents the time; if the impulse response is divided into L frames, the EDC of each frame is calculated as follows:

$$EDC(l) = 10*\log 10\left(\sum_{n=l*N}^{L*N} h_n*h_n\right) \qquad (8)$$

$$= 10*\log 10\left(\sum_{m=l}^{L} g_m\right)$$

for the frame EDC, an EDC slope means an EDC difference between the adjacent frames, that is:

$$q=EDC(l)-EDC(l-1) \qquad (9)$$

where q is the EDC slope; therefore, the following formula is obtained:

$$q = 10*\log 10\left(\sum_{m=l}^{L} g_m\right) - 10*\log 10\left(\sum_{m=l-1}^{L} g_m\right) \qquad (10)$$

$$= 10*\log 10\left(\frac{\sum_{m=l}^{L} g_m}{\sum_{m=l-1}^{L} g_m}\right)$$

$$\approx 10*\log 10\left(\frac{\sum_{m=l}^{\infty} g_m}{\sum_{m=l-1}^{\infty} g_m}\right).$$

The attenuation factor of the envelope predication coefficient between the adjacent frames is as follows:

$$\text{factor}=g_m/g_{m-1} \qquad (11);$$

therefore, the following formula is obtained:

$$q=10*\log 10(\text{factor})$$

$$\text{factor}=10^{q/10} \qquad (12).$$

In this way, the attenuation factor of the envelope predication coefficient can be calculated by calculating the slope q of the EDC. The slope of the EDC may be calculated by using a linear recurrence method. It can be seen that, except that the part belonging to the early-stage echo during the tens of milliseconds at the beginning is non-linear, the EDC is linear, that is, the attenuation factor of the envelope predication coefficient is a fixed value. A large number of frames are used in estimating the echo through the envelope predication coefficient; for example, if the echo tail lasts for 256 ms and the length of each frame is 8 ms, 32 frames are required; as a result, a larger storage space and more calculation are required, while by using the feature that the attenuation factor is a fixed value, the storage space and calculation amount may be reduced. The specific method is as follows:

$$\tilde{E}(i) = \sum_{l=0}^{l0} g_l(i)U_{-l}(i) + \sum_{l=l0+1}^{L-1} g_l(i)U_{-l}(i) \qquad (13)$$

$$= \sum_{l=0}^{l0} g_l(i)U_{-l}(i) + \tilde{E}_{r,m}(i).$$

In the formula, the value of l0 is 7; then, the top 8 frames (64 ms) are considered as the early-stage echo, and the frames following the top 8 frames are considered as the later-stage echo; the later-stage echo is represented by $\tilde{E}_{r,m}(i)$, where m represents the current frame and r represents the later-stage echo. By using the formula factor=$g_l/g_{l-1}$, the approximate estimation manner of $\tilde{E}_{r,m}(i)$ may be obtained:

$$\tilde{E}_{r,m}(i) = \sum_{l=l0+1}^{L-1} g_l(i)U_{-l}(i) \qquad (14)$$

$$\approx \sum_{l=l0+1}^{\infty} g_l(i)U_{-l}(i)$$

-continued $$= \sum_{l=l0+2}^{\infty} g_l(i)U_{-l}(i) + g_{l0+1}(i)U_{-l0-1}(i)$$

$$= \text{factor} * \sum_{l=l0+2}^{\infty} g_{l-1}(i)U_{-l}(i) + g_{l0+1}(i)U_{-l0-1}(i)$$

$$= \text{factor} * \sum_{l=l0+1}^{\infty} g_l(i)U_{-l-1}(i) + g_{l0+1}(i)U_{-l0-1}(i)$$

$$= \tilde{E}_{r,m-1}(i) * \text{factor} + g_{l0+1}(i)U_{-l0-1}(i).$$

(2) The gain of each sub-band is calculated. The gain of each sub-band is calculated by using the following formulas:

$$\tilde{E}_{db}(i) = 10 * \log 10(\tilde{E}(i)) \quad (15)$$

where $\tilde{E}_{db}(i)$ is a decibel value of $\tilde{E}(i)$;

$$\tilde{E}_{db}(i) = 10 * \log 10(E(i)) \quad (16)$$

where $E_{db}(i)$ is a decibel value of $E(i)$.

$$\begin{cases} G(i) = 0.1, & E_{db}(i) - \tilde{E}_{db}(i) <= 0 \\ G(i) = (E_{db}(i) - \tilde{E}_{db}(i)) * & (E_{db}(i) - \tilde{E}_{db}(i) > 0) \& \\ (1 - 0.1)/10 + 0.1, & (E_{db}(i) - \tilde{E}_{db}(i) < 10) \\ G(i) = 1, & E_{db}(i) - \tilde{E}_{db}(i) >= 10. \end{cases} \quad (16)$$

In the foregoing formula, G(i) represents a gain of each sub-band, and $E_{db}(i) - \tilde{E}_{db}(i) <= 0$ represents that the estimated echo is louder than the original echo; at this time, the lower limit 0.1 is assigned to the gain of the sub-band. $E_{db}(i) - \tilde{E}_{db}(i) >= 10$ represents that the original echo is 10 DB louder than the estimated echo; at this time, it may be basically considered that no echo exists in the signals collected by the microphone, and the upper limit 1 is assigned to the gain of the sub-band. $(E_{db}(i) - \tilde{E}_{db}(i) > 0) \& (E_{db}(i) - \tilde{E}_{db}(i) < 10)$ represents that the original echo is 0-10 DB louder than the estimated echo; at this time, the value of the gain of the sub-band ranges from 0.1 to 1, and is in direct proportion to the DB difference of $(E_{db}(i) - \tilde{E}_{db}(i))$.

(3) After the gain of the sub-band is calculated, the gain $G_{he}(k)$ of each spectral line of the high band, that is, the residual echo suppression coefficient, may be obtained by using gain interpolation between the adjacent sub-bands:

$$G(k) = w_k(i)G(i) + w_k(i-1)G(i-1) \quad (17)$$

where $w_k(i)$ is the coefficient used in the calculation of the energy of each sub-band in the foregoing steps.

S205: Multiply a result output by the RES low-band module by the residual echo suppression coefficient output by the RES high-band module, so as to obtain and output a signal E'(k) of which echoes are canceled.

S207: Perform inverse fast Fourier transformation (IFFT, Inverse Fast Fourier Transformation) on the signal E'(k) of which echoes are canceled, then backfill the noise, and output a final processing signal.

It should be noted that, a noise backfill module determines, according to an NLP identifier, whether the current frame is the residual echo; if yes, backfills the noise; and otherwise, determines a VAD identifier; if the current frame is the noise, reserves the noise signal to a noise buffer area.

In the embodiment of the present invention, the signal is divided into a high-band signal and a low-band signal, the existing echo cancellation algorithm is performed on the low-band signal, and the envelope predication echo suppression algorithm is performed on the high-band signal, thereby achieving an effect of greatly reducing the calculation complexity, and meanwhile avoiding a leakage problem at a sub-band adaptive filtering boundary.

Figure 9:
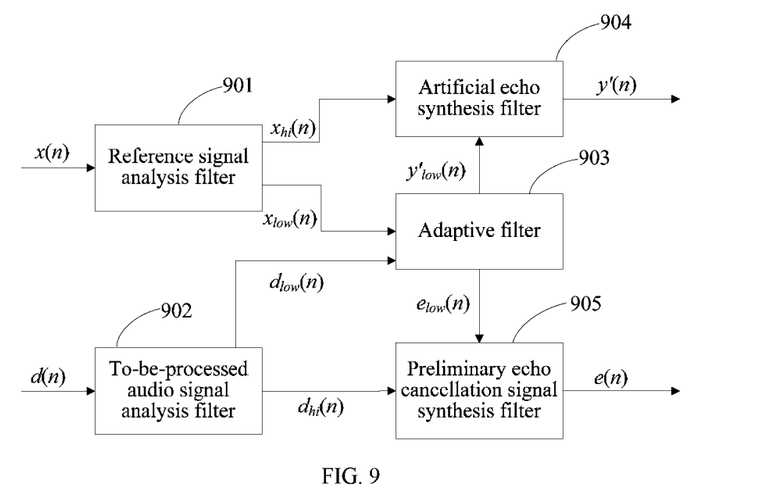
FIG. 9 is a composition structural view of an AEC module for echo cancellation in an embodiment of the present invention.

Referring to FIG. 9, meanwhile, an embodiment of the present invention provides an AEC module for echo cancellation, including:

a reference signal analysis filter 901, configured to process a reference signal x(n) into a high-band reference signal $x_{hi}(n)$ and a low-band reference signal $x_{low}(n)$, output the high-band reference signal $x_{hi}(n)$ to an artificial echo synthesis filter 904, and output the low-band reference signal $x_{low}(n)$ to an adaptive filter 903;

a to-be-processed audio signal analysis filter 902, configured to process an audio signal d(n) to be processed into a high-band audio signal to be processed $d_{hi}(n)$ and a low-band audio signal to be processed $d_{low}(n)$, output the high-band audio signal to be processed $d_{hi}(n)$ to a preliminary echo cancellation signal synthesis filter 905, and output the low-band audio signal to be processed $d_{low}(n)$ to the adaptive filter 903;

the adaptive filter 903, connected to the reference signal analysis filter 901 and the to-be-processed audio signal analysis filter 902; configured to perform adaptive filtering on the low-band reference signal $x_{low}(n)$ to generate a low-band artificial echo signal $y'_{low}(n)$, output the low-band artificial echo signal to the artificial echo synthesis filter 904, perform adaptive filtering on the low-band audio signal to be processed $d_{low}(n)$ to generate a low-band preliminary echo cancellation signal $e_{low}(n)$, and output the low-band preliminary echo cancellation signal to the preliminary echo cancellation signal synthesis filter 905;

the artificial echo synthesis filter 904, connected to the adaptive filter 903; configured to synthesize the high-band reference signal $x_{hi}(n)$ and the low-band artificial echo signal $y'_{low}(n)$ into an artificial echo signal y'(n), and output the artificial echo signal to an RES module; and the preliminary echo cancellation signal synthesis filter 905, connected to the adaptive filter 903; configured to synthesize the high-band audio signal to be processed $d_{hi}(n)$ and the low-band preliminary echo cancellation signal $e_{low}(n)$ into a preliminary echo cancellation signal e(n), and output the preliminary echo cancellation signal to the RES module.

Figure 10:
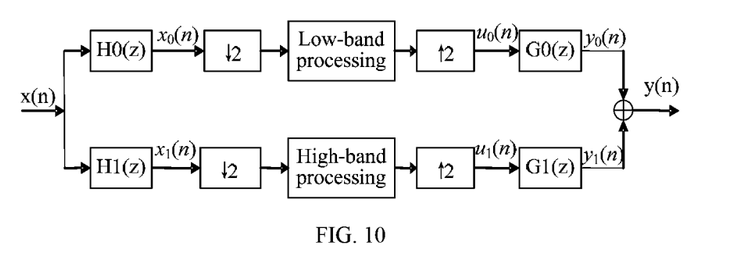
FIG. 10 is a flow chart showing processing performed by a QMF analysis filter and a synthesis filter in a first embodiment of the present invention.

It should be noted that a processing flow of a QMF analysis filter and a synthesis filter is shown in FIG. 10, where after an input signal x(n) is filtered by a low-pass filter H0(z) and a high-pass filter H1(z), a 2-fold down-sampling is performed, and then low-band processing and high-band processing are respectively performed; then, 2-fold up-sampling is performed, respectively, and synthesis filters F0(z) and F1(z) filter the signal; the results are added together to output a synthetic signal y(n). To eliminate the aliasing, the filter has the following limitations:

$$H1(z) = H0(-z)$$

$$G0(z) = 2*H1(-z) = 2*H0(z)$$

$$G1(z) = -2*H0(-z) = -2*H1(z)$$

On the time domain, it is enabled that h0(i)h(i), i=0,1 ... N-1, where N is the length of the filter; then the following result is obtained:

$$h1(i) = (-1)^i h(i)$$

$$g0(i) = 2h(i)$$

$$g1(i) = -2*(-1)^i h(i).$$

Therefore, in design of the filter, merely the low-pass analysis filter needs to be designed, and parameters of other filters may be obtained with reference to the foregoing parameters on the basis of the low-pass analysis filter.

Figure 11:
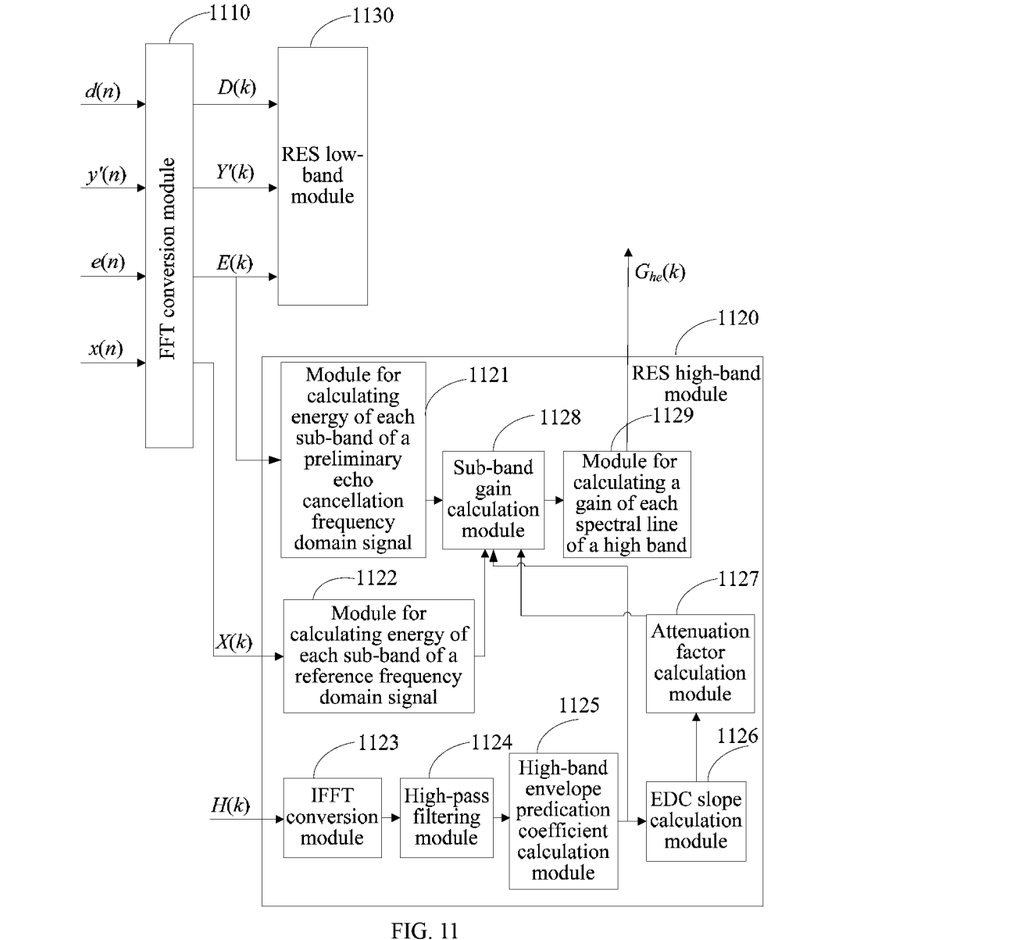
FIG. 11 is a composition structural view of an RES module for echo cancellation in an embodiment of the present invention.

Referring to FIG. 11, meanwhile, an embodiment of the present invention provides an RES module for echo cancellation, including:

an FFT conversion module 1110, configured to perform FFT conversion on a reference signal x(n), an audio signal to be processed d(n), an artificial echo signal y'(n), and a preliminary echo cancellation signal e(n), generate a reference frequency domain signal X(k), a to-be-processed frequency domain audio signal D(k), an artificial echo frequency domain signal Y'(k), and a preliminary echo cancellation frequency domain signal E(k), respectively; input the to-be-processed frequency domain audio signal D(k), the artificial echo frequency domain signal Y'(k), and the preliminary echo cancellation frequency domain signal E(k) to an RES low-band module, and input the reference frequency domain signal X(k), a low-band echo filtering coefficient H(k) and the preliminary echo cancellation frequency domain signal E(k) to an RES high-band module;

the RES high-band module 1120, configured to perform envelope predication echo suppression on a high-band signal in the preliminary echo cancellation frequency domain signal, and calculate and output a residual echo suppression coefficient $G_{he}(k)$; and the RES low-band module 1130, configured to perform echo suppression on a low-band signal in the preliminary echo cancellation frequency domain signal, and output a processing result.

The RES high-band module 1120 includes:

a module 1121 for calculating energy of each sub-band of the preliminary echo cancellation frequency domain signal, configured to calculate energy of each sub-band of a preliminary echo cancellation frequency domain signal and output the energy of each sub-band of the preliminary echo cancellation frequency domain signal to a sub-band gain calculation module 1128;

a module 1122 for calculating energy of each sub-band of the reference frequency domain signal, configured to calculate energy of each sub-band of the reference frequency domain signal and output the energy of each sub-band of the reference frequency domain signal to the sub-band gain calculation module 1128;

an IFFT conversion module 1123, configured to perform IFFT conversion on the low-band echo filtering coefficient, generate a low-band impulse response of a time domain, and output the impulse response to a high-pass filtering module 1124;

the high-pass filtering module 1124, connected to the IFFT conversion module 1123; configured to perform high-pass filtering on the low-band impulse response of the time domain, generate a high-band impulse response, and output the high-band impulse response to a high-band envelope predication coefficient calculation module 1125;

the high-band envelope predication coefficient calculation module 1125, connected to the high-pass filtering module 1124; configured to calculate a high-band envelope predication coefficient $g_f(i)$ according to the high-band impulse response, and output the high-band envelope predication coefficient $g_f(i)$ to an EDC slope calculation module 1126 and the sub-band gain calculation module 1128;

the EDC slope calculation module 1126, connected to the high-band envelope predication coefficient calculation module 1125; configured to calculate an EDC slope and output the EDC slope to an attenuation factor calculation module 1127;

the attenuation factor calculation module 1127, connected to the EDC slope calculation module 1126; configured to calculate an attenuation factor according to the EDC slope, and output the attenuation factor to the sub-band gain calculation module 1128;

the sub-band gain calculation module 1128, connected to the module 1121 for calculating energy of each sub-band of the preliminary echo cancellation frequency domain signal, the module 1122 for calculating energy of each sub-band of the reference frequency domain signal, the high-band envelope predication coefficient calculation module 1125, and the attenuation factor calculation module 1127; configured to calculate a gain of a sub-band according to the energy of each sub-band of the preliminary echo cancellation frequency domain signal, the energy of each sub-band of the reference frequency domain signal, the high-band envelope predication coefficient, and the attenuation factor, and output the gain of the sub-band to a module 1129 for calculating a gain of each spectral line of a high band; and the module 1129 for calculating a gain of each spectral line of a high band, connected to the sub-band gain calculation module 1128; configured to calculate a gain of each spectral line of a high band, that is, a residual echo suppression coefficient, according to the gain of the sub-band.

The device provided in the embodiment of the present invention divides the signal into a high-band signal and a low-band signal, performs the existing echo cancellation algorithm on the low-band signal, and performs the envelope predication echo suppression algorithm on the high-band signal, thereby achieving an effect of greatly reducing the calculation complexity, and meanwhile avoiding a leakage problem at a sub-band adaptive filtering boundary.

According to the description of the foregoing embodiments, a person skilled in the art may clearly understand that the present invention may be implemented by software in addition to a necessary universal hardware platform or by hardware only. In most circumstances, the former is preferred. Based on such an understanding, the technical solutions of the present invention essentially, or the part contributing to the prior art may be implemented in a form of a software product. The computer software product is stored in a storage medium, and includes several instructions for instructing a computer device (which may be a personal computer, a server, or a network device) to perform the method described in the embodiments of the present invention.

The foregoing descriptions are merely exemplary embodiments of the present invention, but are not intended to limit the present invention. Any modification, equivalent replacement, or improvement made within the spirit and principle of the present invention should fall within the protection scope of the present invention.

What is claimed is:

1. An echo cancellation method, comprising:
dividing, by performing Quadrature Mirror Filter (QMF) analysis filtering, an audio signal to be processed into a high-band audio signal and a low-band audio signal;
performing adaptive filtering on the low-band audio signal, and performing QMF synthesis filtering on a signal obtained after the low-band audio signal undergoes the adaptive filtering, and performing the QMF synthesis filtering on the high-band audio signal to generate a preliminary echo cancellation signal;
performing envelope predication echo suppression on a high-band signal in the preliminary echo cancellation signal, and calculating and outputting a residual echo suppression coefficient;

performing echo suppression on a low-band signal in the preliminary echo cancellation signal, and outputting a processing result; and multiplying an output result by the residual echo suppression coefficient, and outputting a signal, wherein echoes of the signal are canceled.

2. The echo cancellation method according to claim 1, wherein the performing the adaptive filtering on the low-band audio signal, and performing the QMF synthesis filtering on a signal obtained after the low-band audio signal undergoes the adaptive filtering, and performing the QMF synthesis filtering on the high-band audio signal to generate the preliminary echo cancellation signal comprises:

generating a low-band preliminary echo cancellation signal after the low-band audio signal undergoes the adaptive filtering; and generating the preliminary echo cancellation signal after performing the QMF synthesis filtering on the low-band preliminary echo cancellation signal and the high-band audio signal.

3. The echo cancellation method according to claim 1, wherein before the performing the envelope predication echo suppression on the high-band signal in the preliminary echo cancellation signal, and calculating and outputting the residual echo suppression coefficient, the method further comprises:

performing the QMF analysis filtering on a reference signal to generate a high-band reference signal and a low-band reference signal;

performing the adaptive filtering on the low-band reference signal to generate a low-band synthesis echo signal; and performing the QMF synthesis filtering on the high-band reference signal and the low-band synthesis echo signal to generate a synthesis echo signal.

4. The echo cancellation method according to claim 2, wherein before the performing the envelope predication echo suppression on the high-band signal in the preliminary echo cancellation signal, and calculating and outputting the residual echo suppression coefficient, the method further comprises:

performing the QMF analysis filtering on a reference signal to generate a high-band reference signal and a low-band reference signal;

performing the adaptive filtering on the low-band reference signal to generate a low-band synthesis echo signal; and performing the QMF synthesis filtering on the high-band reference signal and the low-band synthesis echo signal to generate a synthesis echo signal.

5. The echo cancellation method according to claim 1, wherein the performing the envelope predication echo suppression on the high-band signal in the preliminary echo cancellation signal, and calculating the residual echo suppression coefficient comprises:

calculating energy of each sub-band of the preliminary echo cancellation signal, calculating energy of each sub-band of the reference signal, calculating energy of each sub-band of the residual echo signal, calculating a high-band envelope predication coefficient, and calculating an attenuation factor of the high-band envelope predication coefficient;

calculating a gain of each sub-band of the high-band signal in the preliminary echo cancellation signal according to the energy of each sub-band of the preliminary echo cancellation signal, the energy of each sub-band of the reference signal, the energy of each sub-band of the residual echo signal, the high-band envelope predication coefficient, and the attenuation factor of the high-band envelope predication coefficient; and calculating a gain of each spectral line of the high-band signal in the preliminary echo cancellation signal, as the residual echo suppression coefficient, according to the gain of each sub-band of the high-band signal in the preliminary echo cancellation signal.

6. The echo cancellation method according to claim 2, wherein the performing envelope predication echo suppression on the high-band signal in the preliminary echo cancellation signal, and calculating the residual echo suppression coefficient comprises:

calculating energy of each sub-band of the preliminary echo cancellation signal, calculating energy of each sub-band of the reference signal, calculating energy of each sub-band of the residual echo signal, calculating a high-band envelope predication coefficient, and calculating an attenuation factor of the high-band envelope predication coefficient;

calculating a gain of each sub-band of the high-band signal in the preliminary echo cancellation signal according to the energy of each sub-band of the preliminary echo cancellation signal, the energy of each sub-band of the reference signal, the energy of each sub-band of the residual echo signal, the high-band envelope predication coefficient, and the attenuation factor of the high-band envelope predication coefficient; and calculating a gain of each spectral line of the high-band signal in the preliminary echo cancellation signal, as the residual echo suppression coefficient, according to the gain of each sub-band of the high-band signal in the preliminary echo cancellation signal.

7. The echo cancellation method according to claim 5, wherein the calculating the high-band envelope predication coefficient comprises:

calculating the envelope predication coefficient by using the formula $$g_l(i) = \sum_{n=l*N}^{l*N+N-1} h_n(i) * h_n(i),$$

wherein $g_l(i)$ represents the envelope predication coefficient, N represents a frame length, $h_n(i)$ represents an echo impulse response of each sub-band of the high-band signal in the preliminary echo cancellation signal; and the method for obtaining $h_n(i)$ is: performing Inverse Fast Fourier Transformation (IFFT) conversion on a low-band echo filtering coefficient H(k) to obtain a low-band impulse response of a time domain, and then performing high-pass filtering on the low-band impulse response to obtain a high-band impulse response $h_n(i)$.

8. The echo cancellation method according to claim 6, wherein the calculating the high-band envelope predication coefficient comprises:

calculating the envelope predication coefficient by using the formula $$g_l(i) = \sum_{n=l*N}^{l*N+N-1} h_n(i) * h_n(i),$$

wherein $g_i(i)$ represents the envelope predication coefficient, N represents a frame length, $h_n(i)$ represents an echo impulse response of each sub-band of the high-band signal in the preliminary echo cancellation signal; and the method for obtaining $h_n(i)$ is: performing Inverse Fast Fourier Transformation (IFFT) conversion on a low-band echo filtering coefficient H(k) to obtain a low-band impulse response of a time domain, and then performing high-pass filtering on the low-band impulse response to obtain a high-band impulse response $h_n(i)$.

9. The echo cancellation method according to claim 5, wherein the method for calculating the energy of each sub-band is:

calculating energy of a sub-band of an early-stage echo, and calculating energy of a sub-band of a later-stage echo; and adding the energy of the sub-band of the early-stage echo and the energy of the sub-band of the later-stage echo to obtain the energy of the sub-band.

10. The echo cancellation method according to claim 6, wherein the method for calculating the energy of each sub-band is:

calculating energy of a sub-band of an early-stage echo, and calculating energy of a sub-band of a later-stage echo; and adding the energy of the sub-band of the early-stage echo and the energy of the sub-band of the later-stage echo to obtain the energy of the sub-band.

11. An Adaptive Echo Canceller (AEC) apparatus for echo cancellation, comprising:

a reference signal analysis filter, configured to divide a reference signal into a high-band reference signal and a low-band reference signal, output the high-band reference signal to an artificial echo synthesis filter, and output the low-band reference signal to an adaptive filter;

a to-be-processed audio signal analysis filter, configured to divide an audio signal to be processed into a high-band audio signal to be processed and a low-band audio signal to be processed, output the high-band audio signal to be processed to a preliminary echo cancellation signal synthesis filter, and output the low-band audio signal to be processed to the adaptive filter;

the adaptive filter, connected to the reference signal analysis filter and the to-be-processed audio signal analysis filter; configured to perform adaptive filtering on the low-band reference signal to generate a low-band artificial echo signal, output the low-band artificial echo signal to the an artificial echo synthesis filter, perform the adaptive filtering on the low-band audio signal to be processed to generate a low-band preliminary echo cancellation signal, and output the low-band preliminary echo cancellation signal to the preliminary echo cancellation signal synthesis filter;

the artificial echo synthesis filter, connected to the adaptive filter; configured to synthesize the high-band reference signal and the low-band artificial echo signal into an artificial echo signal; and the preliminary echo cancellation signal synthesis filter, connected to the adaptive filter; configured to synthesize the high-band audio signal to be processed and the low-band preliminary echo cancellation signal into a preliminary echo cancellation signal.

12. A non-transitory computer-readable storage medium including a computer program, executable by a processor, the computer program configured to control the processor to perform a process comprising:

performing FFT conversion on a reference signal, an audio signal to be processed, an artificial echo signal, and a preliminary echo cancellation signal, generate a reference frequency domain signal, a to-be-processed frequency domain audio signal, an artificial echo frequency domain signal, and a preliminary echo cancellation frequency domain signal, respectively; input the to-be-processed frequency domain audio signal, the artificial echo frequency domain signal, and the preliminary echo cancellation frequency domain signal to an RES low-band module, and input the reference frequency domain signal and the preliminary echo cancellation frequency domain signal to an RES high-band module;

performing envelope predication echo suppression on a high-band signal in the preliminary echo cancellation frequency domain signal, and calculate and output a residual echo suppression coefficient; and performing echo suppression on a low-band signal in the preliminary echo cancellation frequency domain signal, and output a processing result.

13. The non-transitory computer-readable storage medium according to claim 12, the process further comprising:

calculating energy of each sub-band of the preliminary echo cancellation frequency domain signal and output the energy of each sub-band of the preliminary echo cancellation frequency domain signal to a sub-band gain calculation module;

calculating energy of each sub-band of the reference frequency domain signal and output the energy of each sub-band of the reference frequency domain signal to the sub-band gain calculation module;

performing IFFT conversion on a low-band echo filtering coefficient, generate a low-band impulse response of a time domain, and output the impulse response to a high-pass filtering module;

performing high-pass filtering on the low-band impulse response of the time domain, generate a high-band impulse response, and output the high-band impulse response to a high-band envelope predication coefficient calculation module;

calculating a high-band envelope predication coefficient according to the high-band impulse response, and output the high-band envelope predication coefficient to an EDC slope calculation module and the sub-band gain calculation module;

calculating an Energy Decay Curve (EDC) slope and output the EDC slope to an attenuation factor calculation module;

calculating an attenuation factor according to the EDC slope, and output the attenuation factor to the sub-band gain calculation module;

calculating energy of each sub-band of the reference frequency domain signal, the high-band envelope predication coefficient calculation module, and the attenuation factor calculation module; configured to calculate a gain of a sub-band according to the energy of each sub-band of the preliminary echo cancellation frequency domain signal, the energy of each sub-band of the reference frequency domain signal, the high-band envelope predication coefficient, and the attenuation factor, and output the gain of the sub-band to a module for calculating a gain of each spectral line of a high band; and calculating a gain of each spectral line of a high band, as a residual echo suppression coefficient, according to the gain of the sub-band.

* * * * *